United States Patent

Shah

[15] 3,654,468

[45] Apr. 4, 1972

[54] RADIATION MEASUREMENT SYSTEM WITH MOSFET ELECTROMETER CIRCUIT WHICH IS PROTECTED AGAINST VOLTAGE TRANSIENTS

[72] Inventor: Franklin Bong-See Shah, Columbus, Ohio
[73] Assignee: Industrial Nucleonics Corporation
[22] Filed: Mar. 11, 1970
[21] Appl. No.: 18,644

[52] U.S. Cl. ............. 250/83.3 R, 250/83.3 D, 250/83.6 R, 330/35
[51] Int. Cl. .......................................... G01t 1/17
[58] Field of Search ............... 250/83.3 D, 83.6 R, 83.3 R; 330/35; 307/235

[56] References Cited

UNITED STATES PATENTS 2,829,268  4/1958  Chope ..................... 250/83.3 D
3,474,347  10/1969  Praglin et al. ................. 330/27
3,316,423  4/1967  Hull ....................... 307/235 X

*Primary Examiner*—James W. Lawrence
*Assistant Examiner*—Morton J. Frome
*Attorney*—Anderson, Luedeka, Fitch, Even and Tabin, William T. Fryer, III and C. Henry Peterson

[57] ABSTRACT

A radiation measurement system includes an electrometer circuit employing a metal-oxide-semiconductor device as an active element for amplifying a minute d.c. input signal from a radiation detector to provide an appreciable signal output voltage. The electrometer comprises means for preventing undesired voltage transients which may be applied with the input signal from puncturing the metal-oxide-semiconductor device, without impairing its ability to amplify the minute d.c. input signal.

14 Claims, 2 Drawing Figures

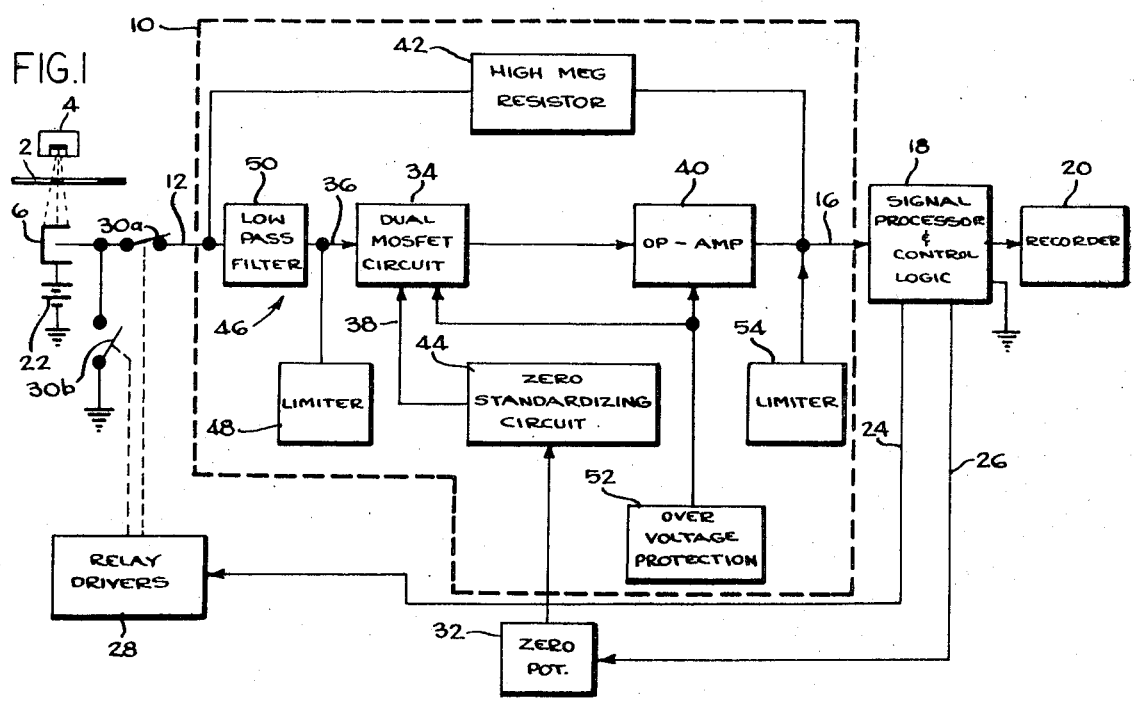
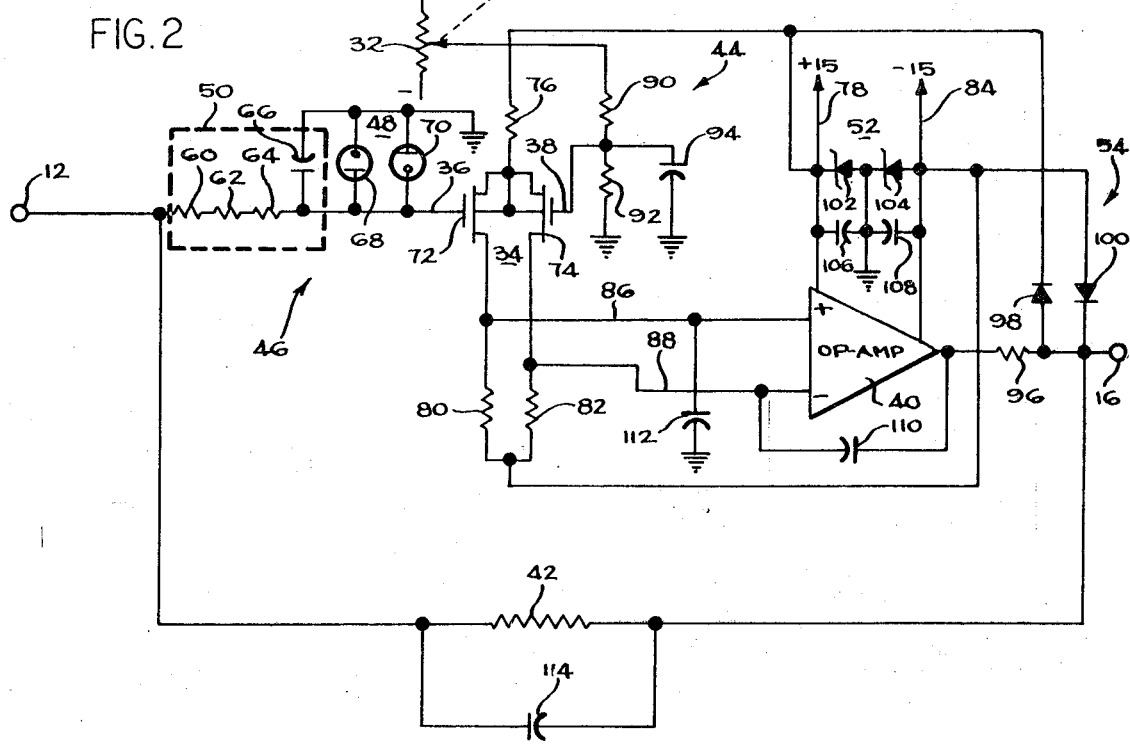

RADIATION MEASUREMENT SYSTEM WITH MOSFET ELECTROMETER CIRCUIT WHICH IS PROTECTED AGAINST VOLTAGE TRANSIENTS

The present invention relates to radiation measuring systems with high gain, direct current amplifier circuits, and more particularly to electrometer circuits for amplifying the output signals produced by the ionization chamber of a radiation gauge in the measurement of a particular material property or characteristic.

The electrical output from such an ionization gauge is generally in the form of an extremely low-level direct current, typically in the range of $10^{-12}$ to $10^{-8}$ amperes, which varies as a function of the density of the material being measured. The detection and measurement of such a current generally requires an amplifier circuit of extremely high input impedance and gain, having essentially no input leakage current. Additionally, such a circuit should desirably have a stable zero-reference level, and negligible zero-reference drift with variations in ambient temperature. Heretofore, electrometer amplifiers commonly employed vacuum tubes as the active amplifying elements, and these circuits generally satisfied, to an extent practicable, the electrical requirements for the detection and measurement of such low-level direct currents. However, the use of vacuum tubes as the active elements in such circuits generally gives rise to the undesirable characteristics of large physical size and relatively high power requirements, in addition to the serious effects caused by the aging of the tubes, resulting in variations in their electrical characteristics.

In connection with this latter problem it was heretofore common practice to pre-age the electrometer tubes for then, considerable period of time to establish somewhat stable characteristics, which, of course, added significantly to the difficulty and cost of manufacturing such electrometers. Even then however, the reliability of such circuits might be affected by continued tube aging during circuit operation.

Although for many electronic applications the disadvantages of physical size and power requirements of vacuum tubes have been obviated by replacing them with transistors, typically of the bipolar type, the mere substitution of such transistors for vacuum tubes in conventional electrometer circuits has not been feasible because of the low input impedance, high leakage currents, and temperature sensitivity which are typically characteristic of such semiconductor devices.

To avoid these problems associated with bipolar transistors and yet obtain the advantages of small size and low power provided by semiconductor devices for electrometer applications, it has heretofore been proposed to use a metal-oxide-semiconductor element in the form of a field-effect transistor as the active element. Such an element differs from bipolar transistors, such as the conventional PNP and NPN types, or conventional field-effect transistors, principally in that the metal-oxide-semiconductor field-effect transistor (hereinafter termed "MOSFET") typically has an extremely high input impedance which is primarily dependent on the insulating properties of a thin silicon dioxide layer between the input gate terminal and the other device elements, rather than on the resistance of a reverse-biased PN junction, as in conventional field-effect transistors. Also, the MOSFET can operate with forward bias to enhance conductance essentially without increasing input current. However, the use of the MOSFET in an electrometer amplifier or any other circuit application where the input is subject to voltage transients presents the problem of MOSFET destruction due to breakdown or puncture of the gate insulation layer. This problem of insulation puncture has generally prevented the practical use of MOSFETs in such applications, since conventional techniques for limiting the input voltage transients typically result in a lowering of the input impedance and/or excessive leakage currents, which impair the ability of the electrometer circuit to measure the low-level signal currents for which it was designed.

In radiation measuring systems such high voltages or transients may be typically produced from various sources including the high voltage applied to the ionization chamber and the switching of various system relays and controls, as well as from inadvertent connections or system sequencing.

Accordingly, it is an object of the present invention to provide an electrometer circuit which utilizes a metal-oxide-semiconductor device as an active element for amplifying low-level d.c. signals from a radiation detector, or otherwise in a radiation measuring system, which may also produce undesired voltage transients, and which circuit has the capability of preventing such transients from destroying the metal-oxide-semiconductor element without impairing its ability to amplify the low-level signals.

It is a further object of the invention to provide an improved electrometer amplifier having the advantages of small size and low energy drain as compared to vacuum tube electrometers, while also maintaining high input impedance, low leakage current, high gain, and a high degree of stability, in addition to reducing or eliminating the aging effects associated with such vacuum tube electrometers.

It is another object of the invention to provide improved means for permitting the use of MOSFETs in circuit applications for radiation measurement wherein the circuit may be subjected to voltage transients which would normally puncture the MOSFET gate insulation.

These and other objects of the invention are more particularly set forth in the following detailed description and in the accompanying drawings, of which:

FIG. 1 is a generalized block diagram of a radiation measuring system employing an electrometer in accordance with an embodiment of the present invention; and FIG. 2 is an electrical schematic diagram of an electrometer amplifier circuit which may be employed in the system of FIG. 1.

Referring now to FIG. 1, there is shown a nuclear radiation measuring system which may be used, for example, for measuring the thickness, density, mass per unit area, or some other absorption dependent property of a sheet 2 passing between a radiation source 4 and a detector 6. The radiation source 4 may comprise any suitable radioactive material such as strontium 90 or carbon 14, and may be typically constructed and positioned so as to direct a beam of, for example, beta rays through the sheet 2 to be measured and toward the detector 6.

Briefly, the system comprises an electrometer amplifier 10 which receives at input terminal 12 a low-level or minute current signal from the radiation detector 6, illustrated as an ionization chamber, and supplies an amplified signal at output terminal 16 to a signal processor and control logic 18 which, in turn, supplies a signal indicative of the average detected radiation intensity to a recorder 20 and/or to various process control apparatus, not shown. The ionization chamber 6, which may be of any suitable type, has a relatively high potential, typically 300 to 900 volts, applied thereto by a battery 22 or other suitable voltage source. Radiation reaching the chamber 6 permits the low-level current, typically between $10^{-12}$ to $10^{-8}$ amperes, to flow to the electrometer input terminal 12.

To permit the measurement of this low-level current, suitable calibration and zero reference must be established. Due to the inherent drift and other characteristics associated with such radiation measurement systems, it is necessary to re-establish the zero reference level of the electrometer, i.e., "zero standardize," at certain intervals, and for this purpose two further outputs, 24 and 26, are shown from the processor and control logic 18. Output 24 is a control signal which actuates relay drivers 28, controlling relay contacts 30a and 30b interposed between ionization chamber 6 and electrometer input 12, for assuring a zero electrical input to the electrometer 10 during zero-standardization. That is, during zero-standardization the output of ionization chamber 14 is disconnected from the electrometer input 12 by the opening of series contacts 30a and is shorted to ground by the closing of shunt contacts 30b. Leakage or off-set currents are nulled out with this arrangement.

Shorting the ionization chamber output, rather than letting it float, eliminates unwanted capacitative coupling to the electrometer, and prevents a charge build-up on the chamber output terminal which would cause the potential at this point to approach that of voltage supply 22. If this were permitted to occur, the reclosing of series contacts 30a would then apply a high voltage pulse to the electrometer input 12, which is to be desirably avoided. On the other hand, if only shunt contacts 30b were employed to establish a zero input, leakage and off-set currents would flow from the feed-back circuit and impair the zero-standardizing operation. Thus, by disconnecting the ionization chamber output from the electrometer amplifier and re-connecting the chamber output to ground, effective zero-standardizing is achieved, while generation of high voltage pulses from input switching is prevented on re-connection of the chamber output to the electrometer when zero-standardizing has been completed.

The other output 26 from the processor and logic 18 is a servo feedback signal which controls a zero-referencing potentiometer 32 which, in turn, resets or re-establishes the zero reference voltage level of the electrometer amplifier 10. Thus, the electrometer is adjusted to provide a zero output for zero input. When the zero-standardizing mode is completed and measurement is to be resumed, the control logic 18 actuates the relay drivers 28 to close series contacts 30a and reopen shunt contacts 30b.

As previously indicated, this system may be utilized, for example, in non-contacting thickness, mass, or density gauges wherein the material 2 to be measured is passed between the ionization chamber 6 and the source 4 of sub-atomic particles, such as beta rays, and the measured parameter of the material is presented on the recorder 20 as a function of the relative absorption of the sub-atomic particles by such material. For example, such a system may be used for the continuous measurement of basis weight in a paper manufacturing process, wherein the output of the signal processor 18 may be additionally used as a feedback signal to control the process for automatically maintaining the basis weight of the sheet at a predetermined value.

Such radiation measurement and process control systems, generally, involve the operation of various relays and controls during normal usage, which tend to generate relatively high voltage transients on the various leads interconnecting the electrometer amplifier 10 to the other parts of the system. In addition, the disconnecting and reconnecting of the electrometer amplifier from and to the ionization chamber for various purposes may produce transients on the input terminal 12 of the electrometer.

In accordance with the present embodiment of the invention, the electrometer 10 comprises a MOSFET differential amplifier arrangement which minimizes or eliminates aging effects and further comprises means for protecting the MOSFET from puncture, or from otherwise being destroyed, by such transients. The differential amplifier arrangement, having a signal input terminal 36 and a reference input terminal 38, comprises a dual MOSFET circuit 34 coupled to an operational amplifier 40, which has its output coupled to the electrometer output terminal 16.

A high megohm resistor 42 is connected from the electrometer input terminal 12 to the output terminal 16 and provides a current bypass and a voltage feedback across the differential amplifier arrangement which maintains the input thereto on terminal 36 at a potential substantially near zero and with essentially no current flow to the terminal 36. The minute current from the ionization chamber 6 therefore flows to the input terminal 12 and through the high megohm resistor branch 42 so that a voltage is provided across this resistor at the input 36 to the dual MOSFET circuit 34, which has a substantially higher input impedance than the resistance value of the resistor 42. This produces an amplified voltage of the opposite sense at output terminal 16 which is fed back through the resistor 42 to the input 12 to maintain the voltage on the terminal 36 near zero. Consequently, a minute current signal input is translated into an appreciable voltage signal at output terminal 16. The value of resistor 42 affects the response time of the electrometer, which generally decreases with decreasing resistance, but the decease may be limited by the percentage of overshoot eventually resulting.

The output signal at terminal 16 will be generally proportional to the difference between the applied signal at input terminal 36 and the reference potential at input 38 applied to the dual MOSFET circuit 34, the reference potential being supplied by the zero standardizing circuit 44 as determined by the servo-controlled zero potentiometer 32. The dual circuit differential amplifier arrangement minimizes the effects of aging, since the parameter variations of the components associated with the signal input and the reference input compensate or offset each other to provide a differential output which is substantially free of variations from this cause.

Now, as previously indicated, voltage transients may be fed to the electrometer input terminal 12 which is coupled to the metal-oxide-semiconductor or MOSFET circuit signal input 36 through protective input circuit means 46. Protective means 46 comprises means, illustrated as limiter 48, for limiting the magnitude or absolute value of the voltage applied to the MOSFET input to voltages less than a predetermined magnitude, determined generally by the rating of the MOSFET element, and further comprises filtering means, illustrated as low-pass filter 50, for attenuating high frequency components of the applied input voltage at 12 to prevent fluctuations in this voltage from producing a voltage on the MOSFET circuit input 36 exceeding a predetermined level within the response time of the limiter 48.

More particularly, the limiter 48 preferably sets a clamped lower or negative voltage threshold or reference and an upper or positive limiting voltage reference so that only voltages between the upper and lower reference voltages are passed to the MOSFET circuit 34, this range being limited to pass only voltage magnitudes less than the puncture or transient voltage rating of the MOSFET. The limiter 48 must also be characterized by an extremely high impedance for signal magnitudes within the passing range so that negligible leakage currents will occur. However, since the limiter 48 will have a finite response time for clamping excessive voltage magnitudes, transients which are outside the limiting range might still puncture the insulating layer of the MOSFET if they have a faster rise time than the response of the limiter, and thus would destroy the MOSFET before the clamping or limiting occurs. Since the voltage transients, or "spikes" as they are sometimes called, have an extremely high rise time and are characterized by predominantly high frequency components, they may be filtered out of the input circuit by the low-pass filter 50 so that only the low frequency components will pass; and since these are necessarily of longer time duration than the high frequency components, any of the low frequency components having an amplitude outside the clamping or reference range of the limiter 48 will be prevented from reaching the MOSFET circuit 34. In other words, the low-pass filter 50 may be considered as "slowing down" the transients which appear at the input terminal 12 so that they are brought or extended to be within the response time of the limiter 48.

Other destructive transients and voltage fluctuations may appear in the power supply circuitry of the system, and these, as previously mentioned, are typically produced by the operation of various types of control devices, relays, motors, etc., which may be activated and deactivated during the functioning of the overall system. Thus, suitable overvoltage protection circuitry, illustrated as 52, is provided which prevents such power supply transients from destroying or deleteriously affecting the MOSFET circuit 34 or the operational amplifier 40.

A further limiter circuit 54 is coupled to the output terminal 16 of the electrometer amplifier 10 to prevent voltage transients which may appear on the output line from being fed back to the MOSFET circuit 34 through the operational amplifier 40. The output line, connecting the electrometer 10 to the signal processor and control logic 18, may be of considerably length since the latter unit is typically located some distance from the electrometer. Thus, this output line may be very susceptible to picking up transients, and the limiter 54 may provide symmetrical clamping voltages to set an amplitude pass band having an effective range between negative and positive values less than the rated puncture voltage of the MOSFET circuit.

Referring now to FIG. 2, there is shown a schematic diagram of a particular electrometer amplifier circuit which may be advantageously employed for the electrometer 10 of FIG. 1, and wherein corresponding elements are indicated by like reference characters.

The input terminal 12, which receives the low-level signal from the ionization chamber, is connected to the input protective circuit means 46 and to the input end of the high megohm resistor 42. The protective circuit means 46 comprises low-pass filter 50 and limiter 48 arranged to operate or act on the input voltage appearing at the input terminal 12.

The low-pass filter 50 comprises series resistors 60, 62 and 64 in the input circuit path and a shunt capacitor 66 coupled to ground, the resistors and capacitor forming an L type filter or integrator. The time constant (RC) of the filter is desirably much greater than the reaction or response time of the limiter 48 which, in the present embodiment, may typically be about 10 microseconds. On the other hand, the time constant should be less than that which would cause instability of the circuit, being typically about 100 microseconds. Thus, in the present embodiment, the time constant was chosen to be about 50 microseconds. Within the framework of these considerations, it is generally desirable to make the resistance of the filter large relative to the capacitance, since from a practical standpoint, it is less space-consuming and easier to provide large resistance than large capacitance. Also, it is desired to minimize d.c. leakage current typically associated with large capacitors.

The limiter 48 comprises a pair of oppositely poled cold cathode diodes 68 and 70 connected between the input terminal 36 of the MOSFET circuit 34 and ground. The diodes 68 and 70 should preferably have relatively high firing speeds, firing or threshold voltages which are below the puncture voltage of the MOSFET circuit, and extremely low leakage current for voltages below the firing voltage. The cold cathode emission characteristics of such diodes generally provide these desired properties. However, even with relatively high firing speeds obtainable in such commercially available diodes, they are not sufficient to prevent puncture of the MOSFET in response to the voltage transients typically occurring in such radiation systems without filtering means to block or shunt the high frequency components of such transients.

Because the input 36 of the MOSFET circuit 34 is normally maintained near zero potential, it is advantageous to connect the diodes 68 and 70 in parallel and directly between this input 36 and ground. This provides symmetrical clamping and limiting levels for voltages having some predetermined absolute value, being either negative or positive, without the necessity for employing additional voltage or bias sources for the diodes. This is particularly preferred at the input to the electrometer which is especially susceptible to the effects of voltage fluctuations and other changes not associated with the input signal. In the illustrated embodiment of the invention, the diodes 68 and 70 have firing voltages at 85 volts, and thus the circuit, as shown, will break down at about ±85 volts, which is lower than the rated puncture voltage of the MOSFET circuit, 125 volts.

The MOSFET circuit 34 is a dual P-channel MOSFET integrated circuit wherein a first MOSFET 72 is responsive to the input signal at its gate 36 and a second MOSFET 74 is responsive to the zero reference potential at its gate 38. Both MOSFETs 72 and 74 have a positive bias applied to their source terminals through a common biasing resistor 76 which is coupled to the +15 volt terminal 78 to a power supply. The drain terminals of each MOSFET 72 and 74 are separately biased by resistors 80 and 82 which are connected to the −15 volt power supply terminal 84. Separate outputs 86 and 88 are taken from each of the drain terminals of the respective MOSFETs and are fed as inputs to the operational amplifier 40.

The zero reference potential on the gate or input 38 of the MOSFET 74 is established by the zero potentiometer 32, as previously discussed in connection with FIG. 1. The voltage from the tap or wiper on the zero potentiometer is supplied to the zero standardizing circuit 44 which comprises a voltage divider having resistors 90 and 92 serially connected to ground with the reference potential to gate 38 taken at the junction therebetween. A smoothing or filter capacitor 94 is also connected between this junction and ground for eliminating noise.

The output voltage of the operational amplifier 40 is proportional to the difference between the voltages on leads 86 and 88, which is proportional to the difference between the input signals to the MOSFETs 72 and 74. The output of the amplifier 40 is supplied to the electrometer output terminal 16 through a relatively low resistance coupling resistor 96. The high gain amplifier 40 provides the desired output signal level.

The limiter 54 at the output comprises a pair of reverse-biased semiconductor diodes 98 and 100. The limiter diode 98 has its anode connected to the output terminal and its cathode connected to the +15 volt supply terminal 78, while the clamping diode 100 has its cathode connected to the output terminal and its anode connected to the −15 volt terminal 84. Together they prevent voltage transients having a magnitude greater than 15 volts from being fed back to the electrometer from the output leads. Since the requirements as regards leakage current are considerably less critical at the output of the electrometer, as compared to the input, any suitable semiconductor diodes may be employed in a conventional limiting and clamping arrangement.

To prevent power supply transients and voltage fluctuations from affecting the MOSFETs or the operational amplifier, the overvoltage protection circuit 52 comprises a pair of breakdown or Zener diodes 102 and 104 which connect each of the power supply terminals 78 and 84, respectively, to ground. Filter capacitors 106 and 108 are connected respectively across each of the Zener diodes to filter noise which may be present on the power supply lines. This regulated and protected voltage supply is then also conveniently used for the limiter circuit 54 to establish the clamping or reference levels.

A capacitor 110 is provided between the negative input terminal of the operational amplifier 40 and its output terminal to compensate for the capacitance of the output to avoid and prevent instability of the circuit. Also, a filter capacitor 112 is connected from the positive input terminal of amplifier 40 to ground. An additional capacitor 114 is connected in shunt with the high megohm resistor 42 to increase the stability of the circuit.

A specific circuit in accordance with that illustrated in FIG. 2, having the following component values, provided satisfactory operation:

Resistors
| | |
|---|---|
| 60 | 500K ½ W C |
| 62 | 500K ½ W C |
| 64 | 500K ½ W C |
| 80 | 40K ⅛ W MF |
| 82 | 40K ⅛ W MF |
| 90 | 499K ⅛ W MF |
| 92 | 499K ⅛ W MF |
| 96 | 100 ohms ¼ W C |

Capacitors
| | |
|---|---|
| 66 | 47 pf |
| 94 | .01 mfd |
| 106 | .01 mfd |
| 108 | .01 mfd |
| 110 | 50 pf |
| 112 | 150 pf |

Diodes
| | |
|---|---|
| 68 | Victoreen Metal Diode (85 v.) |

| | |
|---|---|
| 70 | Victoreen Metal Diode (85 v.) |
| 98 | FD 300 |
| 100 | FD 300 |
| 102 | IN4746 |
| 104 | IN4746 |

| | |
|---|---|
| Dual MOSFET | Union Carbide UC 2701 |
| Op. Amp. | Fairchild [ A 741 |

The high megohm resistor 42 was a Victoreen Hi-Meg. This resistor may have values between $\mu \times 10^8$ and $5 \times 10^{11}$ ohms depending on the desired response or rise time of the electrometer. On testing, with a load resistor equal to or greater than 2 K ohms, the open loop d.c. voltage gain was at least 100,000. The resistance between inputs was $3.6 \times 10^{12}$ ohms at 25° C. and $3.0 \times 10^{10}$ ohms at 100° C. The current stability was indicated by input bias ranging from $0.6 \times 10^{-14}$ amp. through $38 \times 10^{-14}$ amp. for a range of temperature from 25° to 110° C., and the operating temperature range was from −55° to 125° C. As regards voltage stability, the offset was less than 2 volts and adjustable to zero, and varied 10 microvolts per degree centigrade. The voltage noise was less than 5 millivolts peak to peak with a $5 \times 10^{11}$ ohm Hi-Meg resistor. The amplifier output varies between ± 10 volts at 15 milliamps and is capable of driving any line capacitance. The circuit operated with no transient damage to the MOSFETs or other components, and maintained complete stability.

It will, of course, be understood that modifications of the present invention, in its various aspects, will be apparent to those skilled in the art, some being apparent only after study, and others being merely matters of routine electronic design. As such, the scope of the invention should not be limited by the particular embodiment and specific construction herein described, but should be defined only by the appended claims, and equivalents thereof.

Various features of the invention are set forth in the following claims.

What is claimed is:

1. In a radiation measurement system wherein a radiation detector provides a low-level d.c. input signal, an electrometer circuit for amplifying said signal comprising a metal-oxide-semiconductor element having a control terminal and load terminals, input circuit means coupled to the said control terminal and responsive to said input signal and to the undesired voltage transients which may appear therewith, means for coupling said load terminals to a source of power, and output circuit means coupled to said load terminals to supply an amplified output signal corresponding to the low-level input signal, said input circuit means comprising limiting means and filtering means, said limiting means limiting the magnitude of voltages applied to said control terminal to less than a predetermined magnitude, said limiting means having a response time, and said filtering means attenuating high frequency components of voltage applied thereto to prevent fluctuations in voltage applied to said input circuit means from producing a voltage on said control terminal exceeding a predetermined level within said response time of said limiting means.

2. The electrometer circuit of claim 1 wherein said limiting means comprises a diode having an abrupt voltage threshold of conduction at said predetermined magnitude and negligible leakage current in its non-conductive state, said diode being coupled from the control terminal of the metal-oxide-semiconductor element to a reference potential approximately equal to the normal potential on said control terminal.

3. The electrometer circuit of claim 1 wherein said limiting means comprises another diode of the same general type as the first mentioned diode connected in parallel with said first mentioned diode and being oppositely poled with respect thereto.

4. The electrometer circuit of claim 1 wherein the time constant of said filtering means is greater than the response time of said limiting means and less than that which would cause instability of the circuit.

5. The electrometer circuit of claim 1 wherein said filtering means comprises a resistor serially coupled to said control terminal in the signal circuit path and a capacitor having one of its ends connected between the resistor and said control terminal and the other of its ends connected to a reference potential.

6. The electrometer circuit of claim 5 wherein said limiting means comprises a pair of oppositely poled, parallel connected cold cathode diodes, having the anode and cathode of each diode connected between said control terminal and said reference potential.

7. A radiation measurement system for measuring a property of a material, comprising a radiation source providing radiation directed toward the material to be measured; a radiation detector for detecting radiation from said material and including means for providing low-level d.c. signal indicative of the property to be measured; an electrometer circuit coupled to the radiation detector for amplifying said low-level d.c. signal, said electrometer circuit comprising a metal-oxide-semiconductor element having a control terminal and load terminals, input circuit means coupled to said control terminal and responsive to said low-level signal and to undesired voltage transients which may appear therewith, means for coupling said load terminals to a source of power, and output circuit means coupled to said load terminals to supply an amplified output voltage corresponding to the low-level signal, said input circuit means comprising limiting means and filtering means, said limiting means limiting the magnitude of voltages applied to said control terminal to less than a predetermined magnitude, said limiting means having a response time, and said filtering means attenuating high frequency components of voltage applied thereto to prevent fluctuations in voltage applied to said input circuit means from producing a voltage on said control terminal exceeding a predetermined level within said response time of said limiting means, whereby said metal-oxide-semiconductor element is protected from said undesired voltage transients without impairing the operation of said electrometer circuit to provide an output signal indicative of the measured property.

8. The radiation measurement system of claim 7 wherein a source of potential greater than said predetermined magnitude is applied to said radiation detector, said system further comprising means for selectively connecting and disconnecting the output of said radiation detector, respectively, to and from said input circuit means, and means for connecting the output of said radiation detector to a reference potential substantially less than said predetermined magnitude whenever said radiation detector output is disconnected from said input circuit means.

9. A radiation measurement system including an electrometer circuit for converting a minute current from a radiation detector at an input terminal of said circuit to an appreciable voltage at an output terminal, said circuit comprising a differential amplifier including a pair of MOSFETs, each having a control terminal and load terminals a resistor having a resistance value in the order of megohms coupling said input and output terminals, input circuit means coupled to the control terminal of one of said MOSFETs and responsive to voltages at said electrometer input terminal for preventing voltages in excess of a predetermined value from being applied to said control terminal of said one MOSFET, means for applying a selected potential to the control terminal of the other of said MOSFETs, means coupled to a load terminal of each of said MOSFETs for providing at said electrometer output terminal an output voltage signal proportional to the difference between the voltage applied to the control terminal of said one MOSFET and said selected potential, wherein said input circuit means comprises diode means for limiting the magnitude of voltages applied to the control terminal of said one MOSFET to less than a predetermined magnitude, said limiting means having a response time, and filtering means attenuating high frequency components of voltage applied to said input terminal to prevent fluctuations in voltage applied to said input circuit means from producing a voltage on said control terminal of said one MOSFET exceeding a predetermined level within said response time of said limiting means.

10. The system of claim 9 wherein said input circuit means comprises means for limiting the magnitude of voltages applied to the control terminal of said one MOSFET to less than a predetermined magnitude, said limiting means comprising a diode having an abrupt voltage threshold of conduction at said predetermined magnitude and negligible leakage current in its nonconductive state, said diode being connected between the control terminal of said one MOSFET and a reference potential approximately equal to the normal potential on said one MOSFET control terminal.

11. The system of claim 10 wherein said limiting means further comprises another diode like said first mentioned diode connected in parallel therewith and with opposite polarity thereto.

12. The system of claim 11 wherein both of said diodes are of the cold cathode type.

13. The system of claim 9 having a common circuit potential and comprising means for zero-standardizing said radiation measurement system, said zero-standardizing means including means for selectively establishing zero input signal to said input terminal and means for adjusting said selected potential to provide a given system output signal corresponding to said zero input signal, said means for selectively establishing zero input signal comprising means for disconnecting the output of said radiation detector from said input terminal and means for shunting said radiation detector output to the common potential of said circuit.

14. The system of claim 9 comprising means for limiting the magnitude of voltages which may be applied to the electrometer output terminal to values below a given voltage, whereby transients appearing at the output terminal are prevented from being fed back to said MOSFETs.

* * * * *